US005088682A

United States Patent [19]

Gibbs

[11] Patent Number: 5,088,682

[45] Date of Patent: Feb. 18, 1992

[54] FACIA INSTALLATION HOLDER

[76] Inventor: Ronald F. Gibbs, 7019 Clark Rd., Pulaski, N.Y. 13142

[21] Appl. No.: 361,247

[22] Filed: Jun. 5, 1989

[51] Int. Cl.[5] .............................................. F16M 13/00

[52] U.S. Cl. ................................ 248/542; 248/231.4; 248/316.4; 248/544; 269/37; 269/203

[58] Field of Search ...................... 248/542, 544, 231.4, 248/231.6, 316.4, 316.6; 269/41, 249, 203, 900, 37

[56] References Cited

U.S. PATENT DOCUMENTS

| | | | |
|---|---|---|---|
| 1,067,667 | 7/1913 | Lynch | 269/203 |
| 1,328,528 | 1/1920 | Leach | 248/316.6 X |
| 2,179,173 | 11/1939 | Boomgarden | 248/231.4 X |
| 2,291,870 | 8/1942 | Blair et al. | 248/231.4 |
| 2,680,459 | 6/1954 | Dodson et al. | 269/41 X |
| 2,770,271 | 11/1956 | Kane | 269/203 X |
| 4,060,905 | 12/1977 | Light | 248/542 X |
| 4,121,815 | 10/1978 | Paterson | 269/203 |
| 4,340,100 | 7/1982 | Anderson, II | 269/41 X |
| 4,836,517 | 6/1989 | Vossler | 269/41 |

*Primary Examiner*—David L. Talbott

[57] ABSTRACT

A device for holding facia boards in position for attachment to a building is disclosed. The device includes an L-shaped bracket having one leg adapted for removable attachment to a building's roof with a second leg depending down adjacent the position at which the facia board is to be attached. A support member is slidably mounted to the depending leg and supports the facia board in position for attachment to the building. The support is adjustable to accomodate facia boards of different widths.

10 Claims, 1 Drawing Sheet

FACIA INSTALLATION HOLDER

BACKGROUND OF THE INVENTION

This invention relates to carpentry tools. More particularly, the invention relates to a tool for holding a facia board in position at the eve of a building for installation by the craftsman. Facia boards are attached to the eves of buildings and typically are very long and generally unwielding and difficult for one person to properly position, hold and attach and it would be desirable to provide for a tool which will hold these long boards in position for attachment to the building by a single craftsman without assistance.

SUMMARY OF THE INVENTION

According to the invention there is provided a device for holding a facia board in position for attachment to a building including a generally L-shaped mounting bracket member having one leg portion adapted for removable attachment to an external surface of the building's roof deck at its edge with a second leg depending down adjacent the position at which the facia board is to be attached. A support member extends from the depending second leg beneath the installation position and supports the facia board in position.

According to an important feature of the invention, the support member is mounted to the second leg of the mounting bracket member for slidable adjustment for positioning at selected spacings from the mounting leg so as to accommodate and correctly position facia boards of different widths.

According to another important feature of the invention, the second leg of the mounting member is provided with an elongated aperture into which a slide on the support member is received.

According to the invention, the support member is slidable over the length of the elongated aperture as guided therein by the slide.

A still further important feature of the invention provides for a calibrated scale on the second leg of the mounting member and a cooperating index mark on the slide for identifying positions of the support member coinciding with different selected facia board widths.

Another feature of the invention provides for a thumb screw operated frictional retention means for holding the support member at the designated positions.

BRIEF DESCRIPTION OF THE DRAWINGS

The invention will be better understood after reading the following Detailed Description of the Preferred Embodiment in conjunction with the drawings in which.

DETAILED DESCRIPTION OF THE PREFERRED EMBODIMENT

Figure 1:
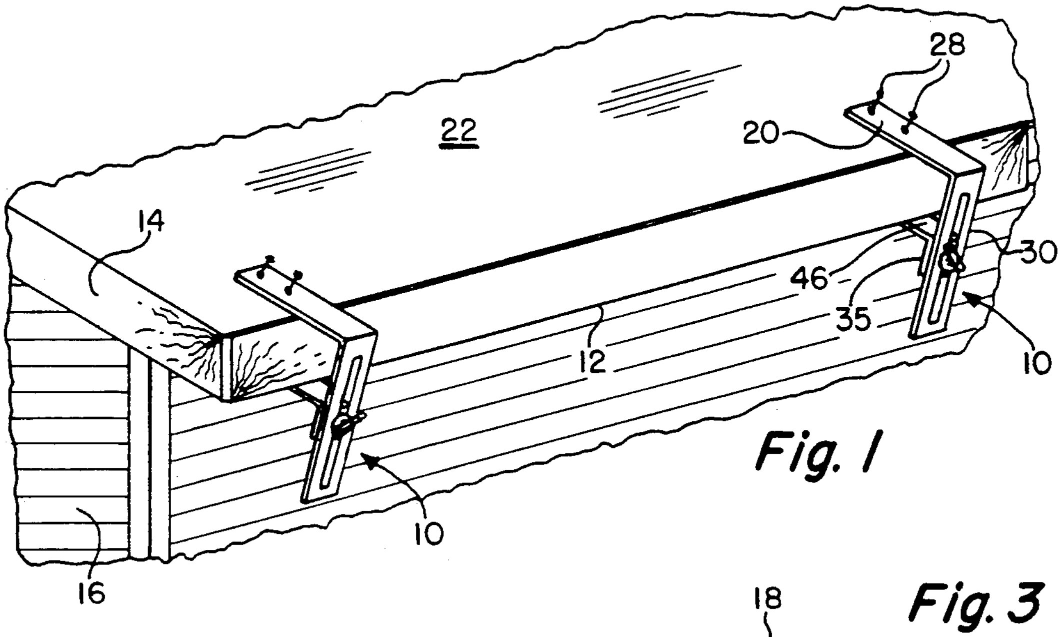
FIG. 1 is a pictorial view of the facia holder according to the invention in use.

Shown in FIG. 1 are a pair of holders 10 according to the invention in use holding a facia board 12 in position for attachment to an eve 14 of a building 16. It is contemplated that more than one holder could be utilized to facilitate one man installation of long facia boards 12.

Figure 2:
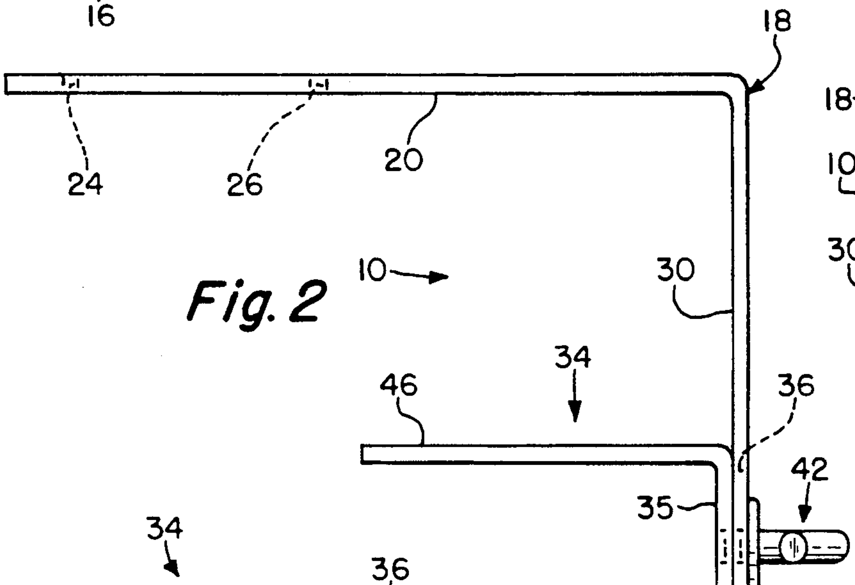
FIG. 2 is a side elevational view of the holder showing details of construction.
Figure 3:
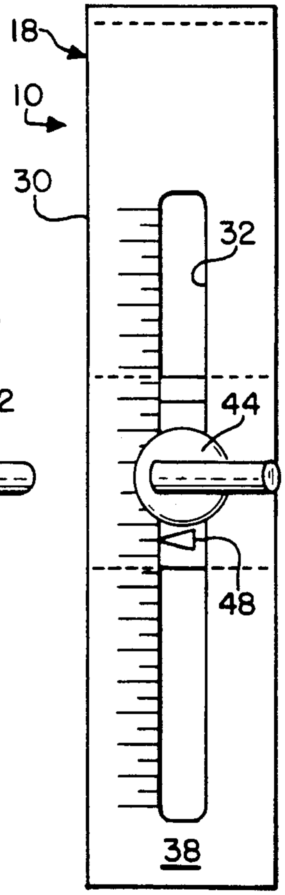
FIG. 3 is an end view of the holder showing details of construction.
Figure 4:
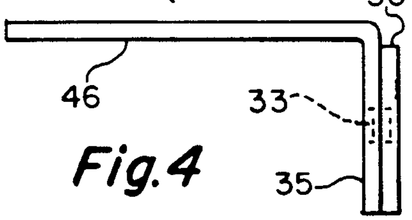
FIG. 4 is a side view of the support member showing details of construction.
Figure 5:
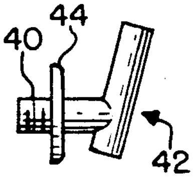
FIG. 5 is a side view of a fastener for retaining the support member in position.
Figure 6:
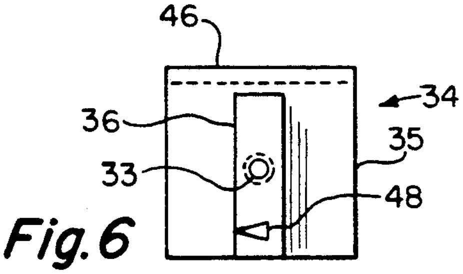
FIG. 6 is an end view of the support member showing further details of construction.

Referring to FIGS. 1 and 2, the holder 10 includes a generally L-shaped mounting member 18 made preferrably of metallic strap having one planer mounting leg portion 20 having a planer mounting surface for engaging against and adapted for removable attachment to the external surface of the roof deck 22 of the building at the edge of the roof. For this purpose, the leg 20 is provided with a pair of holes 24, 26 for receiving a fastener such as nails 28. Extending from the mounting leg 20 and depending down adjacent the location where the facia board is to be attached to the eve is a second leg 30 which is provided with a longitudinal aperture 32. An L-shaped support member 34 carries a slide protuberance 36 on one leg 35, as shown in FIG. 4, which is received in the elongated aperture 32 flush with the surface 38 of the leg 30. The slide is guided for slidable movement over the length of the elongated aperture 32. The protruberance 36 is provided with a tapped hole 33 into which a threaded portion 40 of a thumb screw 42 is threadedly received. The thumb screw 42 carries an enlarged washer-like portion 44 which overlaps the boundry between the slide and aperture and frictionally engages the surface 38 to hold the slide and thus a support ledge 46 of the support member at a desired selected position depending on the width of the facia board to be installed.

If desired, the surface 38 can be provided with an appropriate calibrated scale graduated into different facia board widths designating a proper positioning of the ledge to hold selected facia boards when a corresponding indicator 48 on the slide is aligned with the selected facia board designation on the scale.

As noted, it is contemplated that the holder would be used in pairs to hold long facia boards in position for attachment. The craftsman would first attach the holders to the external surface of the roof deck of the building along the edge of the roof, for example, by driving the nails 28 inserted through the holes 24, 26 in the mounting legs. For example, the nails need not be driven home but only enough to hold the holder in place. A facia board is then positioned on the ledge 46 which extends beneath the desired installation position at a spacing from the mounting leg portion of the holder so as to position the facia board at the proper position for attachment to the building. After attachment, the holders are removed and reattached at other locations as desired.

Having described the preferred embodiment of the invention, those skilled in the art having the benefit of the description and accompanying drawings can readily devise other embodiments and modifications and such other embodiments and modifications are to be considered to be within the scope of the appended claims.

What is claimed is:

1. A device for holding a facia board in a position for attachment to a building, comprising:

a generally L-shaped member including a first leg having a planer mounting surface adapted to engage against a flat external surface of a roof deck of the building proximate an edge of the roof, said first leg including at least one aperture for receiving a fastener there through to be driven into said roof deck, said L-shaped member including a second leg extending from the first leg disposed adjacent the attachment position with the first leg attached to the external surface of said roof deck; and a support member extending from said second leg disposed beneath the attachment position with the first leg attached to the external surface of the roof deck said support member mounted to said second leg for selective positioning at a plurality of different positions spaced from said first leg to accomodate a plurality of facia boards having different widths.

2. The device as defined in claim 1 wherein said support member is mounted for slidable movement along the length of said second leg.

3. The device as defined in claim 2 wherein said second leg includes a longitudinally elongated aperture and said support member includes guide means disposed in said elongated aperture.

4. The device as defined in claim 3 wherein said support member is L-shaped having one leg defining a support ledge and a second leg including a protuberance slidally received in said elongated aperture defining said guide means.

5. The device as defined in claim 4 wherein said protuberance includes a tapped hole and said device further includes a fastener receivable in said tapped hole, said fastener including a shoulder engageable against said second leg to releasably retain said support member at said different position.

6. The device as defined in claim 4 further including means for indicating positions of said support member corresponding to predetermined spacings between said first leg and said support ledge corresponding to predetermined facia board widths.

7. The device as defined in claim 6 wherein said means for indicating includes a graduated scale of said second leg adjacent said elongated aperture including indicia of facia board widths and an indicator on said support member.

8. A device for holding a facia board in a position for attachment to a building, comprising:

a bracket member including a first portion having a planer surface adapted to engage against a flat external surface of a roof deck of the building proximate an edge of the roof deck and a second portion depending from the first portion adjacent the position on the building with the first portion attached to the external surface of the roof deck; and a support member mounted to said second portion for slidable positioning and retention at selected positions spaced from said first portion disposed beneath said position.

9. A device for holding a facia board of at least one width in a position for attachment to a building, comprising:

a generally L-shaped member including a first leg having a planer mounting surface for engaging against a flat external surface of a roof deck at least one hole for receiving a fastening element to removably attach said first leg to said external surface of the roof deck of the building and a second leg extending from said first leg having a longitudinally elongated aperture having a length;

a support member extending from said second leg including means received in said elongated aperture for guiding said support member for slidable movement over the length of the elongated aperture; and fastener means for retaining said support member at selected positions along the length of the elongated slot.

10. The device as defined in claim 9 further including means for indicating a plurality of predetermined spacings between said first leg and said support member.

* * * * *